United States Patent
Breed et al.

(10) Patent No.: US 6,875,976 B2
(45) Date of Patent: Apr. 5, 2005

(54) APERTURE MONITORING SYSTEM AND METHOD

(75) Inventors: David S. Breed, Boonton Township, Morris County, NJ (US); Wilbur E. DuVall, Kimberling City, MO (US); Wendell C. Johnson, Signal Hill, CA (US)

(73) Assignee: Automotive Technologies International, Inc., Denville, NJ (US)

( * ) Notice: Subject to any disclaimer, the term of this patent is extended or adjusted under 35 U.S.C. 154(b) by 165 days.

(21) Appl. No.: 10/191,692

(22) Filed: Jul. 9, 2002

(65) Prior Publication Data

US 2002/0179822 A1 Dec. 5, 2002

Related U.S. Application Data

(63) Continuation-in-part of application No. 10/152,160, filed on May 21, 2002, now abandoned.
(60) Provisional application No. 60/292,386, filed on May 21, 2001.

(51) Int. Cl.$^7$ ............................. G06M 7/00; H01J 40/14
(52) U.S. Cl. ........................ 250/221; 340/555; 318/262
(58) Field of Search ............................... 250/221, 222.1; 340/555–557, 565, 541, 542.2, 542.3, 545.7, 545.1; 318/264–266, 466, 565

(56) References Cited

U.S. PATENT DOCUMENTS

| | | | | |
|---|---|---|---|---|
| 4,114,146 A | * | 9/1978 | Inoue et al. | 367/93 |
| 5,291,202 A | | 3/1994 | McClintock | 342/16 |
| 5,589,838 A | | 12/1996 | McEwan | 342/387 |
| 6,031,600 A | * | 2/2000 | Winner et al. | 356/3.01 |
| 6,157,024 A | | 12/2000 | Chapdelaine et al. | 250/221 |

* cited by examiner

*Primary Examiner*—Thanh X. Luu
*Assistant Examiner*—Seung C. Sohn
(74) *Attorney, Agent, or Firm*—Brian Roffe

(57) ABSTRACT

System and method for detecting the presence of an object in an aperture in which for modulated electromagnetic waves are directed from an edge of a frame defining the aperture and electromagnetic waves reflected from an opposite edge of the frame are received at substantially the same location. The phase change between the modulated electromagnetic waves and the reflected electromagnetic waves is measured wherein the presence of an obstacle in the aperture causes a variation in the phase change from a situation where an obstacle is not present. The system and method can be used in vehicles to determine the presence of obstacles in the path of a closing window, door, trunk lid, convertible top, or sunroof.

42 Claims, 7 Drawing Sheets

US 6,875,976 B2

APERTURE MONITORING SYSTEM AND METHOD

REFERENCE TO RELATED APPLICATION

This application is a continuation-in-part of U.S. patent application Ser. No. 10/152,160 filed May 21, 2002.

This application claims priority under 35 U.S.C. §119(e) of U.S. provisional patent application Ser. No. 60/292,386 filed May 21, 2001 through U.S. patent application Ser. No. 10/152,160 filed May 21, 2002.

FIELD OF THE INVENTION

This invention relates a system and method for monitoring the presence of an obstacle in an aperture, specifically, an aperture in a vehicle, for the purpose of halting closure of the aperture when an obstacle is detected in the path of the closing member.

BACKGROUND OF THE INVENTION

Closures for apertures such as vehicle windows, sunroofs and sliding doors, and soon swinging doors, are now commonly motor driven. As a further convenience to an operator or passenger of a vehicle, such power windows are frequently provided with control features for the automatic closing and opening of an aperture following a simple, short command from the operator or passenger. For instance, a driver's side window may be commanded to rise from any lowered position to a completely closed position simply by momentarily elevating a portion of a window control switch, then releasing the switch. This is sometimes referred to as an "express close" feature. This feature is commonly provided in conjunction with vehicle sunroofs. Auto manufacturers may also provide these features in conjunction with power doors, hatches or the like. Such automated aperture closing features may also be utilized in various other home or industrial settings.

Other convenience features now being offered for use on vehicles include environmental venting modes, in which vehicle windows are automatically lowered or opened a prescribed distance once a control system determines a certain temperature threshold, internal or external, has been met or exceeded. In addition, a precipitation detection system may be provided for sensing the advent of precipitation and for automatically closing a sunroof, windows or an automatic door. These specific examples pertain to vehicles, though other instances of automatic aperture adjustment are known to one skilled in the art.

In addition to providing added convenience, however, such features introduce a previously unencountered safety hazard. Body parts or inanimate objects may be present within an aperture when a command is given to automatically close the aperture. For example, an automatic window closing feature may be activated due to rain while a pet in the vehicle has its head outside a window. A further example includes a child who has placed his or her head through a window or sunroof and then he or she accidentally initiates an express close operation.

In order to avoid tragic and damaging accidents involving obstacles entrapped by a power window, some vehicles are now provided with systems which detect a condition where a window has been commanded to express close, but which has not completed the operation after a given period of time. As an example, a system may monitor the time it takes for a window to reach a closed state. If a time threshold is exceeded, the window is automatically lowered. Another system monitors the current drain attributed to the motor driving the window. If it exceeds a threshold at an inappropriate time during the closing operation, the window is again lowered.

The problem with such safety systems is that an obstacle must first be entrapped and subject to the closing force of the window or other closure for a discrete period of time before the safety mechanism lowers the window. Limbs may be bruised and fragile objects may be broken by such systems. In addition, if a mechanical failure in the window driving system occurs or if a fuse is blown, the obstacle may remain entrapped.

To address these shortcomings, a system has been proposed which monitors the environment adjacent to or within an aperture, and which may be used as an obstacle detection system, among other applications. This system may be used in conjunction with a power window to prevent activation of an express close mode, to stop such a mode once in progress, or to exit an express close mode and automatically reverse the window motion. The system comprises an emitter positioned in proximity to the aperture to emit a field of radiation adjacent the aperture. A detector is also provided which normally receives radiation reflected from one or more surfaces proximate the aperture. When an obstacle enters the radiation field, it alters the amount of reflected radiation received at the detector. This alteration, if sufficient to meet or exceed a threshold value, can be used to prevent, stop or reverse an express close mode, to activate a warning annunciator, or to initiate some other action.

The economics of producing such a system dictate that it is not feasible to produce a system custom-tailored for the environment of every vehicle in which it is installed. This is also true if the system is installed for some other non-vehicle application. Therefore, depending upon the reflecting characteristics of the environment proximate the aperture, the system detector will provide varying degrees of sensitivity. In one embodiment where the detector registers a high degree of reflectivity from the environment and is triggered by an obstacle which decreases the reflected radiation, it is desirable that the environmental reflectance be maximized. In contrast, in an embodiment where the detector senses a minimum of reflected radiation normally and is triggered by a higher degree of reflectance from an obstacle, it is desired to minimize environmentally reflected radiation. In vehicle applications, radiation reflectance is likely to vary between vehicle manufacturers, between vehicle models and model years, and between individual vehicles, due to the physical orientation of surfaces adjacent an aperture and the materials comprising such surfaces.

Additionally, reflecting surfaces adjacent the aperture tend to alter over time. For vehicles, such alteration may be across manufacturers, models, model years and individual vehicles. Thus, a monitoring system initially optimized for a particular environment may not be optimized for the useful life of the system. In the worst case, environmental changes are sufficient to cause reflected energy to register in the system as an obstacle when no obstacle is present.

U.S. Pat. No. 6,157,024 (Chapdelaine et al.) describes a monitoring system for use in detecting the presence of an obstacle in or proximate to an aperture. Materials are applied to one or more reflecting surfaces adjacent the aperture, enabling the improvement of the signal-to-noise ratio in the system without requiring tuning of the system for the particular environment. The choice of specific materials depends upon the type of radiation used for aperture monitoring and whether an obstacle is detected as an increase or decrease in reflected radiation. A calibration LED within the monitoring system enables predictable performance over a range of temperatures. The monitoring system is also provided with the capacity to adjust to variations in the background-reflected radiation, either automatically by monitoring trends in system performance or by external command. The latter case includes the use of a further element for communicating to the monitoring system directly or indirectly.

The disclosure of Chapdelaine et al. is incorporated herein by reference in its entirety as if it had been set forth herein.

The device of Chapdelaine suffers from the problem that its performance depends on the known and calibrated reflectivity of the reflecting edge surface of the aperture. These are special materials that are applied to such reflective surfaces. The reflection properties of such surfaces can change over the life of the vehicle and although some effort is made to compensate for this change. If the properties of such surfaces change the system can fail. Thus, a system that does not depend on the reflective properties of the aperture edges would not require the application of special materials to such surfaces and would also remove this failure mode. A calibration LED is used in the Chapdelaine device that is also a source of additional failure modes and thus the elimination of this device will improve the reliability of the system.

OBJECTS OF THE INVENTION

It is an object of the present invention to provide a new and improved system for monitoring closure of apertures.

It is an object of the present invention to provide a new and improved system for monitoring closure of apertures in vehicles such as windows, doors, sunroofs, convertible tops and trunks.

It is another object of the present invention to provide a new and improved system for monitoring closure of apertures such as windows, doors, sunroofs, convertible tops and trunks in a vehicles and to suppress closure of the same if an obstacle is detected.

It is another object of the present invention to provide a new and improved aperture monitoring system that does not depend on the reflectivity of the edges of the aperture and does not require the application of special materials to such edges.

It is another object of the present invention to provide a new and improved aperture monitoring system that does not require the use of a calibration system such as a calibration LED.

SUMMARY OF THE INVENTION

In order to achieve at least one of the above objects, a system for detecting the presence of an object in an aperture in accordance with the invention comprises an electromagnetic wave emitting device for emitting modulated electromagnetic waves and directing the modulated electromagnetic waves from at least one edge of a frame defining the aperture, a receiver device for receiving reflected electromagnetic waves and a device for measuring a phase change between the modulated electromagnetic waves and the reflected electromagnetic waves. The phase change measurement device may be embodied in the electromagnetic wave receiving component(s), or possibly in a processor or other similar type of control logic component. The presence of an obstacle in the aperture causes a variation in the phase change from a situation where an obstacle is not present. That is, when the system is installed in connection with the frame, the phase change is measured when it is known that an obstacle is not present and stored in a memory unit such as a memory of a microprocessor. In this case, the electromagnetic waves are emitted from one edge of the frame defining the aperture and reflected from an opposite edge of the frame to be received by a electromagnetic wave receiver on the same edge of the frame as the electromagnetic wave emitter (the electromagnetic wave emitter and receptor preferably being collocated). This phase change may vary depending on the distance between the edges of the frame. In use, the phase change of the electromagnetic waves emitted is again measured and compared with the reference phase change(s) stored in the memory unit whereby any variations between the measured phase change and the reference phase change are indicative of electromagnetic waves not being reflected from the opposite edge of the frame, but instead being reflected from an object in the aperture.

As noted above, the electromagnetic wave receiving device can be collocated with the electromagnetic wave emitting device, and may also comprise a linear CMOS array or a one-dimensional camera, focal plane array or similar one or two dimensional electromagnetic wave receiver. The electromagnetic wave emitting device may comprise one or more electromagnetic wave emitting diodes or a scanning laser system, which may operate in the visual, infrared or other portion of the electromagnetic spectrum. In the latter case, a single photo diode can be used as the receiving device.

The electromagnetic wave emitting device may be designed to modulate the electromagnetic waves with a wavelength between about 1 foot and 20 feet and direct the electromagnetic waves into a plane substantially parallel to a plane in which the aperture is situated, which would be appropriate for substantially planar apertures, e.g., for sliding doors or windows in vehicles. For non-planar apertures, an appropriately shaped mirror or lens or a two-dimensional receiver or scanner can be used.

A method for detecting the presence of an object in an aperture in accordance with the invention comprises the steps of directing illuminating electromagnetic waves toward at least a portion of a frame defining the aperture, modulating the illuminating electromagnetic waves, providing a device for receiving electromagnetic waves reflected from an opposite part of the frame, and detecting the presence of an obstacle in the aperture by measuring a phase change between the modulated electromagnetic waves and the reflected electromagnetic waves. The presence of an obstacle in the aperture causes a variation in the phase change from a situation where an obstacle is not present. Thus, as in the system described above, a reference phase change, or a reference phase change function (phase change expressed as a function of the location along the edge of the frame defining the aperture), is obtained by measuring the phase change between the modulated electromagnetic wave and the reflected electromagnetic wave when an obstacle is known not to be present in the aperture. Detection of the presence of an obstacle is facilitated by a comparison of the measured phase change to the reference phase change or reference phase change function. The properties of the system described above can be utilized in the method in accordance with the invention.

Another system for detecting the presence of an object in an aperture comprises an electromagnetic pulse emitting mechanism for emitting an electromagnetic pulse and directing the electromagnetic pulse from at least one edge of a frame defining the aperture, a receiver for receiving reflected electromagnetic waves from the electromagnetic pulse and a processor or similar mechanism for measuring a time of flight between the emission of the electromagnetic pulse and the reception of the reflected electromagnetic waves. The presence of an obstacle in the aperture causes a variation in the time of flight from a reference time of flight in a situation where an obstacle is not present in the aperture.

The electromagnetic pulse emitting mechanism may comprise at least one light emitting diode and/or be structured and arranged to direct the electromagnetic pulse into a plane substantially parallel to a plane in which the aperture is situated. The electromagnetic pulse emitting mechanism and receiver may be collocated in the frame defining the aperture.

Another method for detecting the presence of an object in an aperture comprises the steps of transmitting a coded signal toward at least a portion of a frame defining the aperture, providing a mechanism for receiving the coded signal reflected from the portion of the frame, and detecting the presence of an obstacle in the aperture by measuring the time of flight between the transmission of the coded signal and the reception of the coded signal using correlation. The presence of an obstacle in the aperture causes a variation in the time of flight from a situation where an obstacle is not present.

The coded signal may be a phase or amplitude modulated carrier wave or an individual pulse.

In a preferred embodiment, a reference time of flight or reference time of flight function is obtained by measuring the time of flight between the transmitted coded signal and the received coded signal when an obstacle is known not to be present in the aperture. As such, detection of the presence of an obstacle in the aperture may entail comparing the reference time of flight or reference time of flight function to the measured time of flight whereby a difference between the measured time of flight and the reference time of flight or reference time of flight function is indicative of the presence of an object in the aperture.

The mechanism for receiving the coded signal may be a linear CMOS array arranged in the frame of the aperture, a one-dimensional camera or a single photo diode.

Transmission of the coded signal may be achieved by arranging at least one electromagnetic wave emitting diode in the frame of the aperture, arranging a plurality of electromagnetic wave emitting diodes in the frame of the aperture or directing a laser beam and moving the laser beam to scan across at least a portion of the aperture.

BRIEF DESCRIPTION OF THE DRAWINGS

The following drawings are illustrative of embodiments of the system developed or adapted using the teachings of this invention and are not meant to limit the scope of the invention as encompassed by the claims.

DETAILED DESCRIPTION OF THE PREFERRED EMBODIMENTS

A fundamental difference between this invention and the monitoring system described in Chapdelaine et al. is that the instant invention is not primarily concerned with the reflectivity of the surface which the infrared LED, for example, illuminates. Rather, in the invention, the reflections from the surface are used to measure distance using a phase change in the modulated electromagnetic waves and thus, there is little concern with reflectivity of these surfaces as long as there are some reflected electromagnetic waves. This makes this invention significantly improved over the system described in Chapdelaine et al.

For example, one advantage of this invention over the system of Chapdelaine et al. is that calibration based on reflectivity is not required, as it is in the system of Chapdelaine et al. A calibration based on phase is required when the system is first installed in a vehicle or in an early sample of a particular vehicle model.

A fundamental concept of this invention is therefore to determine the distance to a reflective object that is reflecting infrared rays to the receptor based on relative phase. This is accomplished by modulating the illuminating electromagnetic waves and measuring the phase of the reflected electromagnetic waves compared to the illuminating electromagnetic waves. Naturally, since some parts of the window edge are closer than other parts, it is necessary to divide the window edge up into a number of parts. This can be accomplished in a variety of ways. The preferred method is to use a linear CMOS array as the receptor. This array may be composed of as many as 1000 to 4000 pixels that are arranged in a single line. It is therefore a one-dimensional camera.

Figure 4:
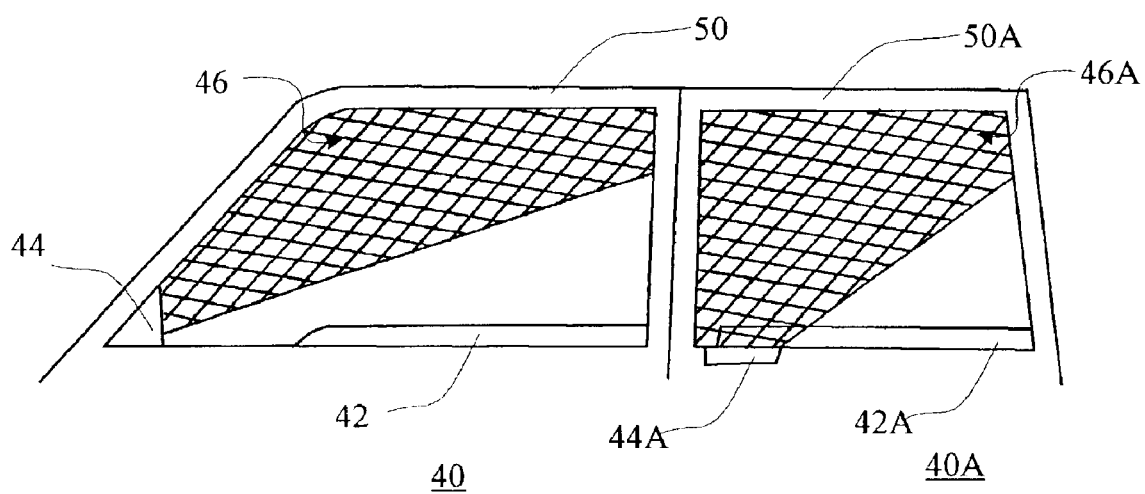
FIG. 4 is an illustration of the placement of aperture monitoring systems, such as of FIG. 3, in a vehicle for use with vehicle windows.

The electromagnetic waves from the LED or laser diode, in the preferred implementation, is distributed into a line which illuminates those sections of FIG. 4. A lens receives the reflected electromagnetic waves from the illuminated window frame, for example, and since the electromagnetic waves have been modulated with a frequency having a wavelength of something like two feet, the distance to the reflected surface on a pixel-by-pixel basis for each pixel can be determined. This can be done by any manner known to one skilled in the art. Usually, a processor is employed with an appropriate measurement ability or unit to calculate the distance between the electromagnetic wave emitter/receptor and the obstacle based on the time between the transmission and reception of the electromagnetic waves. Since a phase change can also be determined when the installation is made, which will serve as the reference phase change, if any object penetrates the plane of electromagnetic waves created by the focused LED or laser diode, one or more pixels will register a change in phase (which would be different than the reference phase change) and therefore a change in distance to the reflecting object. This then determines that there is an object in the window space and therefore the automatic window closure system must be suppressed. In the alternative, the system does not have to be associated with an automatic window closure system but could simply be associated with a system which detects the presence of objects in the aperture. The system could thus notify a driver via a display, alarm or other similar device when a passenger sticks his or her hand, head or foot out of the window.

There is a tradeoff between the wavelength and the microprocessor accuracy. A phase difference between two signals can be measured to at least one part in 1000. Thus, the distance measurement capability of a modulated wavelength of two feet provides is 0.002 feet or 0.024 inches. This is easily accomplished and is greater accuracy than required by government specifications. This also requires a 16-bit processor. An 8-bit processor can measure approximately 0.1 inches for a two-foot wavelength or 0.05 inches for a 1-foot wavelength. However, to achieve a one-foot wavelength, more sophisticated modulation electronics are required, thus the tradeoff. It is easier to create longer wavelengths but that requires higher precision processors to determine phase differences.

If a thousand pixel CMOS array is used and if the illuminated pinch area of the window is two feet long, then each pixel, through an appropriately designed lens or mirror, will measure a length of the illuminated window edge of about 0.024 inches. This is sufficient to easily detect a 3 mm diameter rod, the requirement of the federal standard.

The preferred system described above uses an infrared LED (light emitting diode) with appropriate optics to create a line of electromagnetic waves which illuminates the window frame just inside of the window glass. It is thus not interfered with by the position of the glass in the window. An alternate system is to use the LED or a laser in a scanning mode in which case the 1000 pixel linear CMOS array can be replaced by a single photo diode. Again, as above, the electromagnetic radiation will be modulated with a wavelength somewhere between about 1 and about 20 feet. The optical receptor is simplified by this alternate design at the expense of requiring a scanning system to be used in conjunction with the LED or laser infrared electromagnetic wave source.

An alternate approach is to use multiple LEDs and to excite an array of such illumination sources sequentially or by some other known pattern. To achieve the same resolution as can be achieved with a 1000 pixel CMOS array, however, would require an array of electromagnetic wave sources of comparable magnitude.

The system can also be used to monitor vehicle sliding doors. In this case, the electromagnetic wave source and a receiver array are placed just inside door and it monitors closure of the sliding door by creating a plane of electromagnetic waves in the area just inside the sliding door. The technique used is the same. Any object that penetrates the plane of electromagnetic waves will create a return that is closer to the CMOS (or equivalent) linear array than expected, that is, the phase difference will be less than expected. This event can cause the motion of the sliding door to stop.

If someone outside of vehicle carefully positions his or her fingers in the path of the sliding door, then the system described above will not respond. Thus, the system will only properly respond to an obstruction that comes from inside the vehicle. If an obstruction from outside the vehicle is also required to be sensed, then a separate unit, perhaps a Capacitive sensor or a beam linearly covering the last few inches of door travel but from outside of the vehicle, can be used. The key point is that this system measures the distance from a reflected electromagnetic wave source to a pixel and if that distance sensed is different than expected then the system will stop moving the door toward the closed position.

Up until now we have only considered a flat plane of electromagnetic waves. The shape of the sealing area of a typical trunk is not the border of a plane. Instead, it follows a torturous path. The system of this invention with some significant enhancements can also solve the trunk lid closure problem.

In this case, the sealing areas of the trunk must be illuminated with the infrared radiation. Since the line that needs to be illuminated is a torturous path and does not lie in plane, the electromagnetic waves used to illuminate the pinch area as well as the system that receives the reflected electromagnetic waves must be capable of dealing with this geometry. One method is to use a mirror for both projecting the electromagnetic waves to the pinch area and receiving reflected electromagnetic waves and projecting it onto a linear CMOS array. Although it is theoretically possible to accomplish this using lenses, the design of such lenses is more complicated and their manufacture could likewise be a problem. If a mirror is used, on the other hand, this problem becomes significantly less. The mirror would thus have a complex shape as it reflects the LED electromagnetic waves around the edges of the trunk and receives the reflected electromagnetic waves and straightens them into a straight line for illuminating the CMOS one-dimensional camera.

An alternate but more complicated approach is to use a two-dimensional camera and pattern recognition algorithm such as a neural network to track the motion of the trunk lid. A further alternate is to use a two dimensional scanning system that is controlled to follow the contour of the trunk lid aperture.

Figure 1:
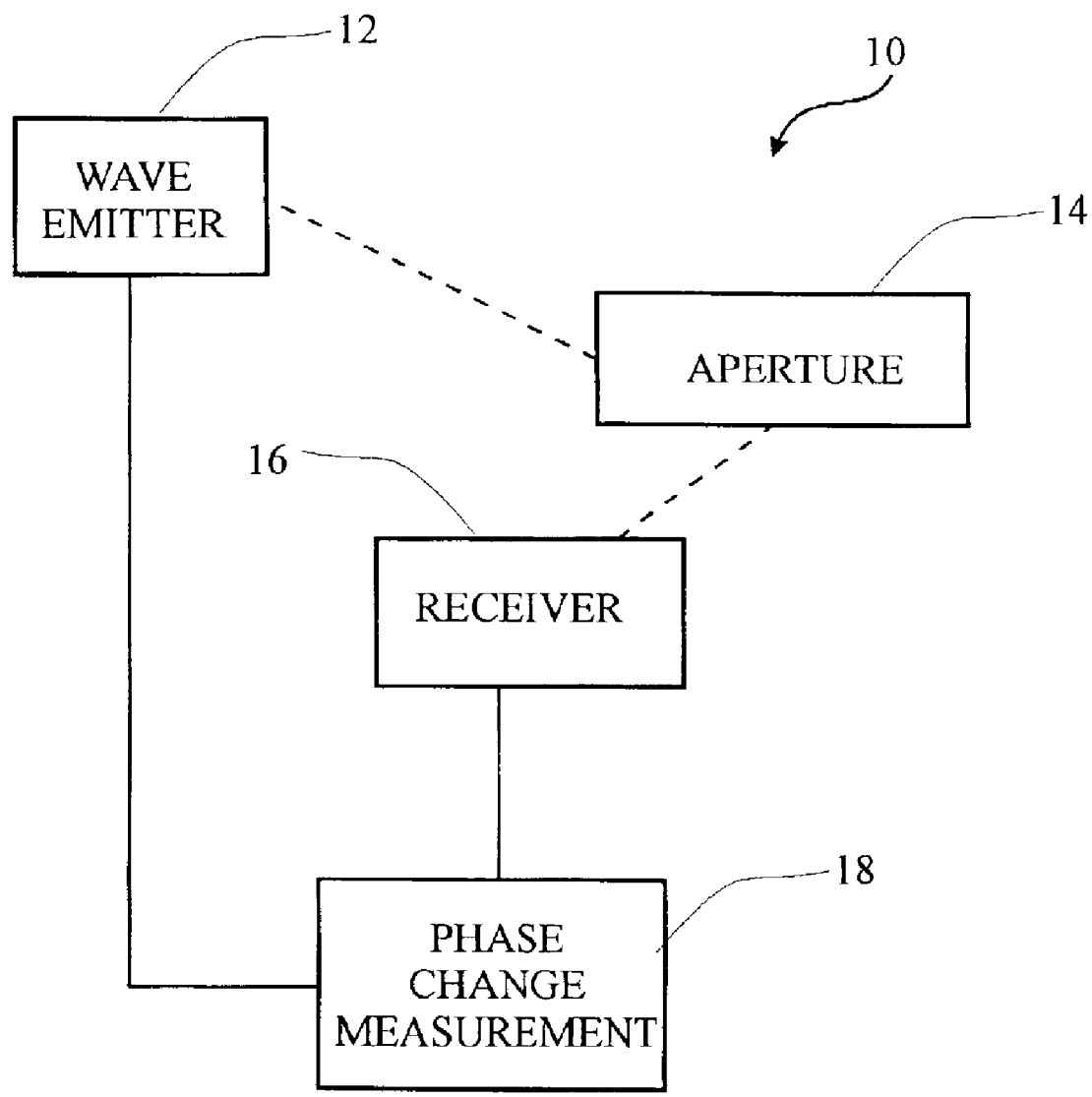
FIG. 1 is a schematic of an aperture monitoring system in accordance with the present invention.

Thus, as shown in FIG. 1, the aperture monitoring system 10 in accordance with the invention includes a wave emitter 12, e.g., an electromagnetic wave emitter, a receiver 16 which receives waves reflected by an edge of a frame defining an aperture 14 when no obstruction is present or from an obstruction in the aperture when present, and a phase change measurement system 18. The emitter 12 includes appropriate components to modulate the waves, which are typically sine waves and referred to as a sine wave modulated carrier waves. Operation of the emitter 12 can be dependent on the satisfaction of a condition such as the presence of an object in the vehicle, proximate the vehicle, proximate the aperture, in the seat alongside the aperture, or the operation of the window or door etc.

The phase change measurement system 18 measures a phase change, or the phase of the modulation, between the modulated waves and the reflected waves. In an initialization step, the phase change is measured in the absence of an obstruction over the aperture. This phase change measurement can be stored in a memory unit associated with or part of the phase change measurement system 18. In some cases where the variation from vehicle to vehicle is small, the initialization step can be done on any example of a vehicle model and then used for all other particular vehicles belonging to that model.

In operation, the emitter 12 continuously or periodically emits waves over the aperture 14, again in possible dependence on satisfaction of a condition which would indicate the possibility of an obstruction in the aperture or operation of the door or window etc. The receiver 16 receives a reflection of waves and enables the phase change measurement system 18 to determine the phase change between the emitted modulated waves and the received waves. This phase change is compared to the stored phase change in order to determined whether the aperture 14 is obstructed. If so, appropriate action can be taken, such as halting closure of the window.

Figure 2:
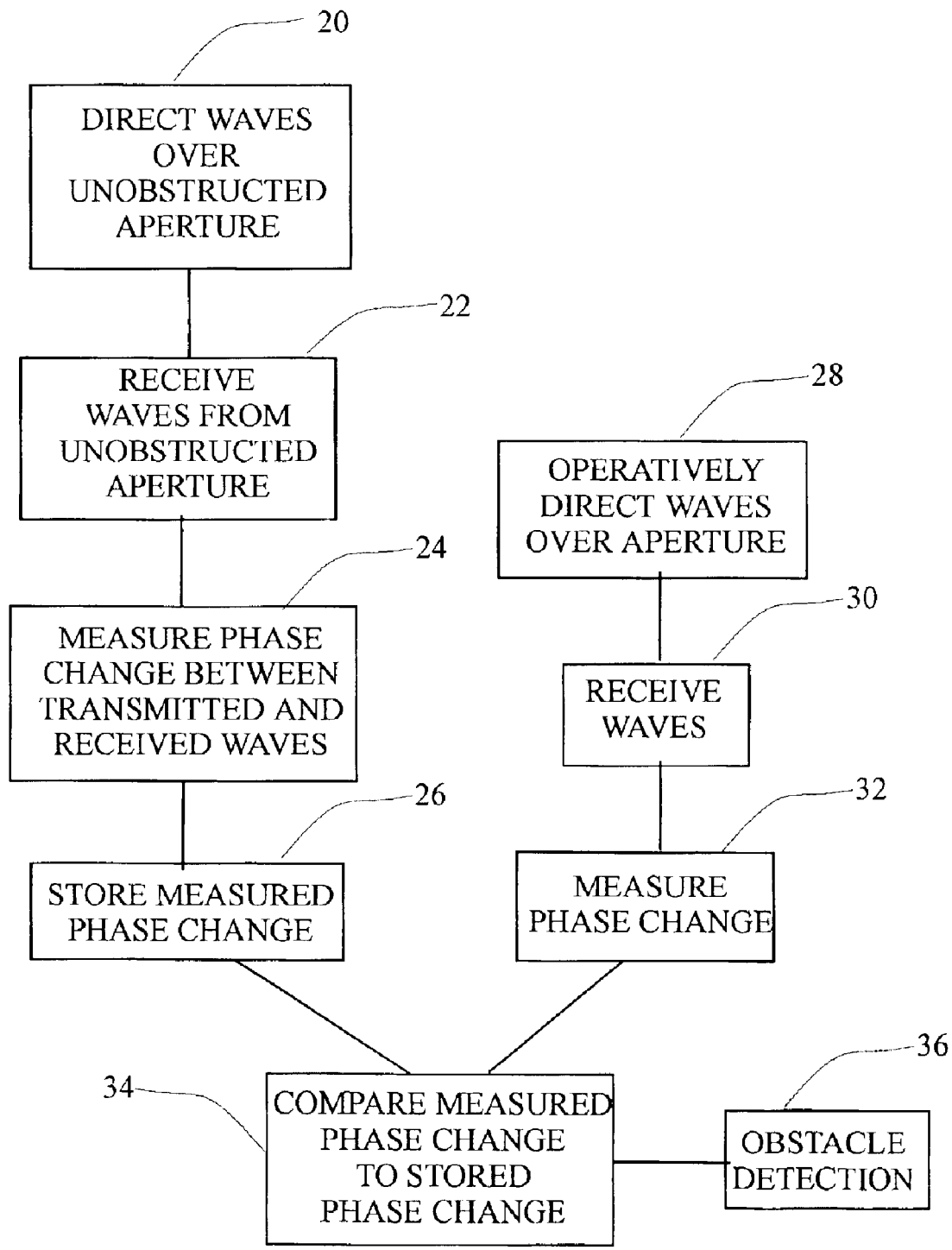
FIG. 2 is a flow chart of a method for monitoring an aperture in accordance with the present invention.

FIG. 2 shows a flow chart of the method for monitoring an aperture in accordance with the invention wherein in step 20, waves are directed over an unobstructed aperture. The reflected waves are received by a receiver 22, which may be collocated with the emitter from which the waves are emitted. A phase change between the modulated waves and the received waves is measured at 24 and stored at 26 as a reference phase change for future use, i.e., during operation of the method, e.g., when installed in a vehicle. The measured phase change can vary along the aperture, in which case, the reference phase change may be a reference phase change expressed as a function of the distance along the side of the frame defining the aperture.

Thereafter, in operation, modulated waves are continuously or periodically directed over the aperture at 28 and received by a receiver 30. The phase change between the modulated waves and the received waves is measured or determined at 32 and then compared with the reference phase change (or reference phase change function) at 34. If there is a difference between the reference phase change and the operationally-measured phase, an indication of the detection of an obstacle or obstruction is provided at 36. This may take the form of a warning light, a warning alarm, cessation of an activity such as closure of the aperture, etc.

Figure 3:
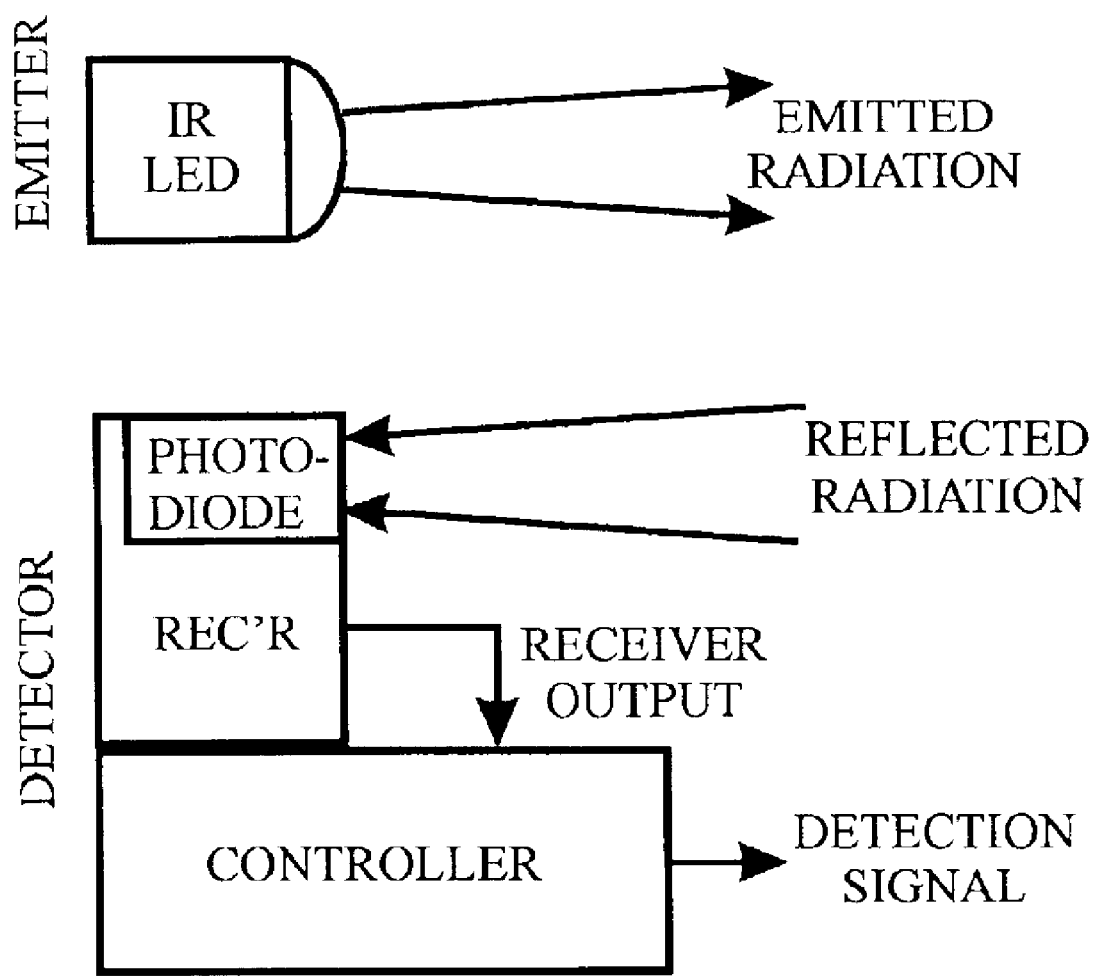
FIG. 3 is a block diagram of an aperture monitoring system in accordance with the present invention.

FIG. 3 shows another embodiment of the invention including a detector, comprising a receiver and a controller. The detector may be an optical detector, an infrared detector, an ultrasound detector, or similar devices. The receiver may be either integral with or in communication with the controller. The receiver output is indicative of the strength of the received, reflected radiation. For example, the receiver may produce plural pulses having durations related to the intensity of the energy received by the detector. The detector may then deliver a detection signal when the duration of one pulse exceeds a predetermined value, referred to as a threshold. Alternatively, the detector may produce the detection signal when the duration of each of a predetermined number of consecutive pulses exceeds the threshold.

The threshold may be related to the duration of a pulse when no obstruction is present or the average duration of pulses produced when no obstruction is present and a closure such as a window or door moves from an open position to a closed position. The threshold may include a correction factor that accounts for variations in the duration of pulses produced when no obstruction is present, and may vary based upon the position of the closure. The threshold, or some other value indicative of an obstruction-free opening, may be stored during an initialization procedure.

The initialization procedure may be performed once and for all on any sample of a vehicle model, when the vehicle is manufactured and/or at every time when the vehicle is occupied or when the seat adjacent the aperture is occupied. Thus, a seat or vehicle presence determination unit can be provide in the vehicle and used as a trigger to initiate the initialization procedure. As such, the initialization procedure is performed when the vehicle is occupied and/or when the seat adjacent he aperture is occupied. Alternately, the initialization procedure can take place once or from time to time when the seat is known to be unoccupied and thus there cannot be an obstruction in the aperture.

The threshold may be a single value, whereby an alarm condition is recognized if a pulse duration value is either above or below the threshold, depending upon the embodiment. Alternatively, the threshold may be defined by a range of acceptable values, whereby an alarm condition is recognized if the pulse duration value is only above this range, only below this range, or either above or below the range.

Alternatively, the detector may provide some other output signal representative of the received radiation strength, such as an analog signal whose voltage varies with the level of the received radiation.

The detector and emitter may be contained in an integral unit, which may be a compact unit in which the detector and the emitter share a common lens. The emitter may include a light emitting diode or a laser device.

Automatic closing or opening of the closure within the aperture may be initiated by a rain sensor, a temperature sensor, a motion sensor, a light sensor, or by manual activation of a switch. Thus, a system in accordance with the invention may be provided with a signal commanding the opening or closing of an aperture, this signal coming from one of many possible sources. However, the system provides the same function, regardless of the source of the control command.

In a preferred embodiment, the monitoring system is activated after receipt of this commanding signal and before operation of the powered closure, though it can also be utilized to determine aperture environment status at any other time. While the present invention is directed towards the detection of an obstacle within an aperture about to be closed, it may also be utilized to detect conditions proximate a closed aperture prior to initiating the opening of the aperture. For instance, in a system which is adapted for monitoring the environment adjacent an automatic sliding door, it may be useful to inhibit automatic opening of the door if the monitoring system detects the presence of an object lying against the inside surface of the door. It may be preferable to provide an override feature to a door control system such that a warning from a monitoring system may be overridden.

With respect to FIG. 4, an aperture monitoring system is illustrated in the form of a vehicle window monitoring system. This system includes a front emitter/receiver unit 44 disposed in a front door 40 and positioned to produce an energy curtain 46 in a region to be traversed by a front window. Also provided is a rear emitter/receiver unit 44A in a rear door 40A, positioned to produce a second energy curtain 46A. An opposite side of the vehicle would typically be provided with like monitoring systems for the respective windows.

The emitter/receiver units 44, 44A include emitters that produce the energy curtains 46, 46A and receivers that detect any portion of the respective energy curtain that is reflected back to the emitter/receiver units 44, 44A from the window frame 50, 50A. Depending upon the monitoring system embodiment, an obstacle interjected into the radiation field either increases or decreases this reflected portion of the radiation curtain.

The front emitter/receiver unit 44 is positioned at the lower front corner of the window aperture. This ensures that the energy curtain 46 covers a significant portion of the window aperture, a portion in which an obstruction could be caught between the window and the surrounding window frame. Likewise, the rear emitter/receiver unit 44A is positioned at the lower front corner of the window. This positioning ensures suitable coverage of the aperture by the radiation curtain 46A, and enables convenient installation within a door panel.

Figure 5:
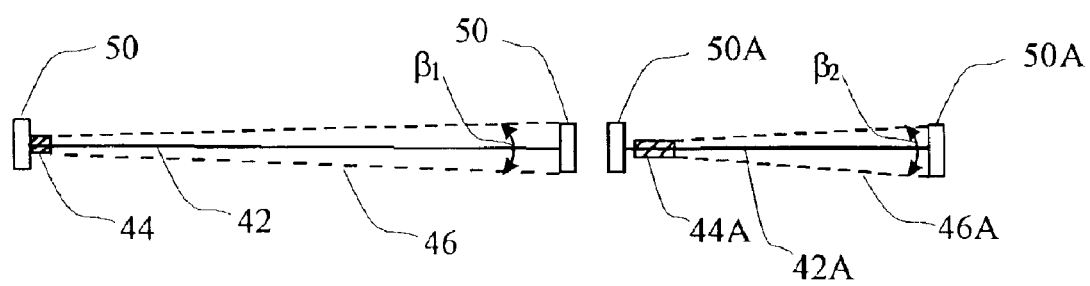
FIG. 5 is a top view of the systems of FIG. 4.

With respect to FIG. 5, the two emitter/receiver units 44, 44A are positioned so that horizontal angles $\beta_1$, $\beta_2$ of the energy curtains 46, 46A are roughly centered in the window frame 50, 50A of the door 40, 40A. This ensures that, even if an emitter/receiver unit 44, 44A is mis-aligned due to vibration, repeated door closure, or other reason, the energy curtains 46, 46A will still be capable of detecting obstructions in the planes defined by the respective windows. Installation concerns arising from aligning discrete emitter and receiver units are also addressed by packaging the emitter and receiver in the same physical package. Common packaging also minimizes the opportunity for misalignment between the emitter and receiver due to environmental vibration or shock. In many implementations, the angles β are smaller than illustrated in FIG. 5.

The installations illustrated for the vehicle window embodiments in FIGS. 4 and 5 may be instructive in envisioning installations proximate sunroofs, power doors or other apertures having power or automatic closures. What is required is an emitter/receiver unit positioned relative to the aperture such that a radiation field is capable of being emitted adjacent or within the respective aperture, or both; a predictable radiation return is generated in the absence of a foreign object near or within the aperture.

A controller associated with the emitter/receiver unit operates the aperture monitoring system according to a prescribed series of steps, discussed in greater detail below. Typically, the controller does not activate the monitoring system until the controller has received a close request signal. Automatic close requests can be generated by the controller itself in response to input from various environmental sensors such as a rain sensor or a temperature sensor. An automatic close request can also be generated by a vehicle operator or passenger, and is typically identified by the controller as the activation of a window control switch for more than a certain time period, e.g. 3/10 second. If the close request is an automatic close request, the controller activates the appropriate emitter, then the characteristics of the receiver output pulse are analyzed. In an embodiment where the output pulse width is varied according to the received radiation phase, the presence of an obstruction adjacent or within the aperture is reflected in a variance of the receiver output pulse widths from a predicted norm. Thus, the controller detects obstructions by comparing the output pulse width t to T, an initialization value related to the length of a detection pulse produced by the receiver when an aperture environment is free from obstructions. T is generated in an initialization procedure during installation of the system. The emitter is activated and the detection signal is monitored while the aperture is closed under obstruction-free conditions. T, the average value of the output pulse width while the window is being closed, is determined from the detection signal.

The controller receives inputs from various system sensors, such as a rain sensor, temperature sensor, light sensor and the aperture monitoring system, and provides control signals to window motors, a sunroof motor, or an automatic door motor, depending upon the specific application. The controller can also interface the aperture monitoring system to an alarm unit which may produce audible or visual alarms, and which may prevent vehicle operation. The alarm unit may also transmit an alarm or beacon signal, such as an RF signal at a specified frequency.

Additional details of the use of the controller and aperture monitoring system can be found in U.S. Pat. No. 6,157,024, incorporated by reference herein.

It has been assumed above that the transmitted electromagnetic waves are in the form of a modulated carrier frequency and the phases of the transmitted and received waves are compared. Other techniques can also be employed without deviating from the scope of this invention including transmitting a single pulse of radiation and measuring the time of flight to the reflection surface and back. Another preferred technique is to pulse modulate either a carrier wave or to send pure pulses of electromagnetic radiation to the reflection surfaces and compare the returned signal with the transmitted signal through a correlation analysis, or other appropriate technique, such as disclosed in various patents on micropower impulse radar and noise radar. See for example, U.S. Pat. Nos. 6,121,915, 5,291,202, 5,719,579, and 5,075,863 (all of which are incorporated by reference herein) for examples of the use of noise radar and U.S. Pat. Nos. 5,774,091, 5,519,400 and 5,589,838 as examples of micropower impulse radar (all of which are incorporated by reference herein). In many cases pseudo-noise can be used in place of random noise.

Figure 6:
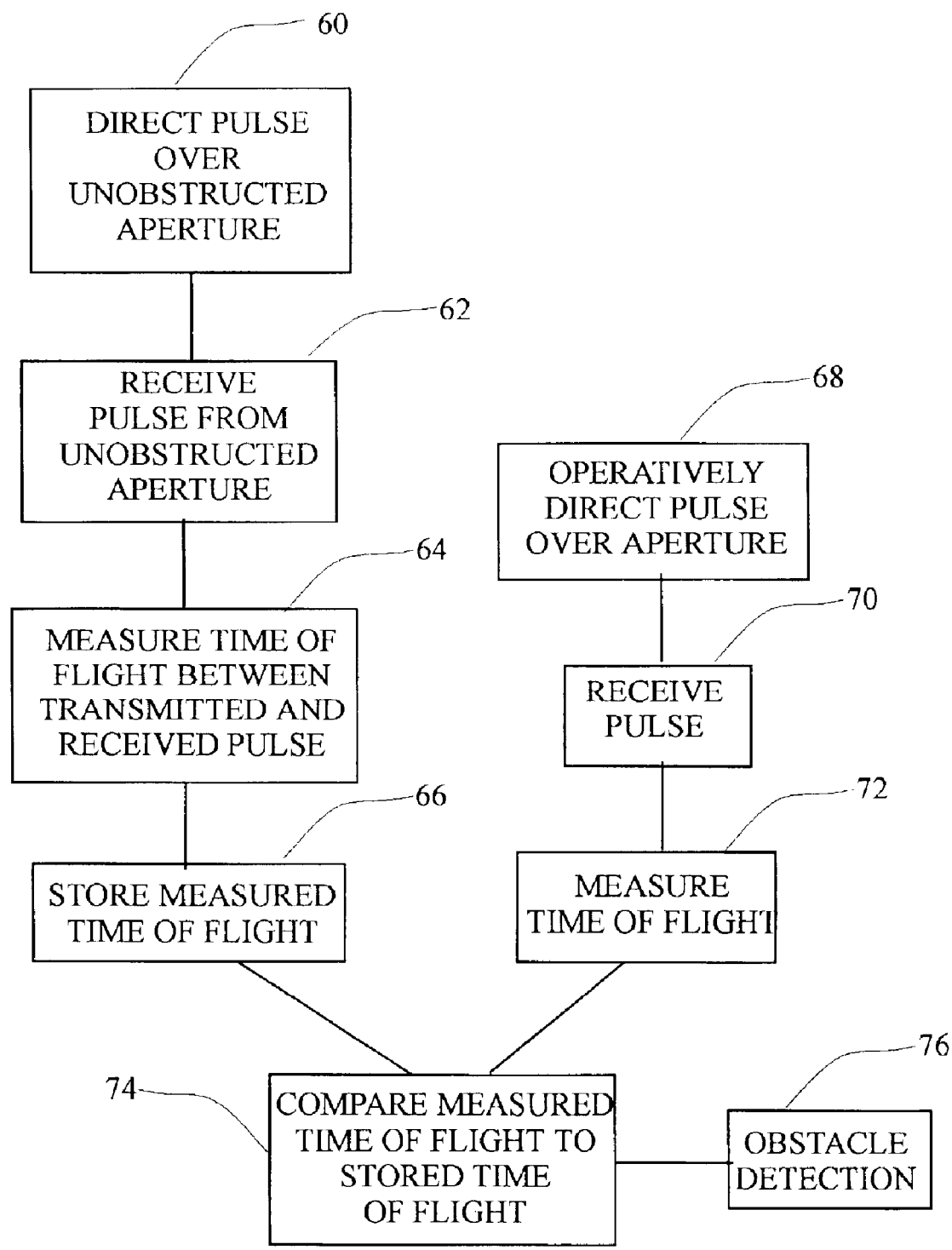
FIG. 6 is a flow chart of another method for monitoring an aperture in accordance with the present invention.

The embodiment wherein the time of flight of the radiation pulses is used to determine the presence or absence of an obstacle in an aperture is shown in FIG. 6. In step 60, a pulse of radiation is directed over an unobstructed aperture. A pulse can be directed at multiple times so that a series of pulses is generated. The reflected pulse is received by a receiver 62, which may be collocated with the emitter from which the pulse is emitted. The time of flight is measured at 64, i.e., the time span between the emission of the pulse and the reception of the pulse, and stored at 66 as a reference time of flight for future use, i.e., during operation of the method, e.g., when installed in a vehicle. The measured time of flight can vary along the aperture, in which case, the reference time of flight may be a reference time of flight expressed as a function of the distance along the side of the frame defining the aperture.

Thereafter, in operation, pulses are continuously or periodically directed over the aperture at 68 and received by a receiver 70. The time of flight between the emitted pulse and the received pulse is measured or determined at 72 and then compared with the reference time of flight (or reference time of flight function) at 74. If there is a difference between the reference time of flight and the operationally-measured time of flight, an indication of the detection of an obstacle or obstruction is provided at 76. This may take the form of a warning light, a warning alarm, cessation of an activity such as closure of the aperture, etc.

As discussed above, in one embodiment of the invention, a sine wave modulated carrier wave is emitted or transmitted and the phase of the modulation measured. In the alternative, it is contemplated that a square wave or pulse modulation can be used with a code (such as 10011101011000) and as long as the code is unique, the time of flight can be determined by comparing the coded signal that was sent to that which is received and determining the delay. Either individual pulses can be sent or the carrier wave can have its amplitude—or phase—modulated. The returned wave is compared with the sent wave using a technique called correlation. Correlation is a whole field by itself and there are fast correlators (that work on the information sent and received during a chosen interval as a whole) in existence so that you do not have to use a trial and error method. One skilled in the art of correlation would be able to readily select particular types and constructions of correlators for use in the invention.

Figure 7:
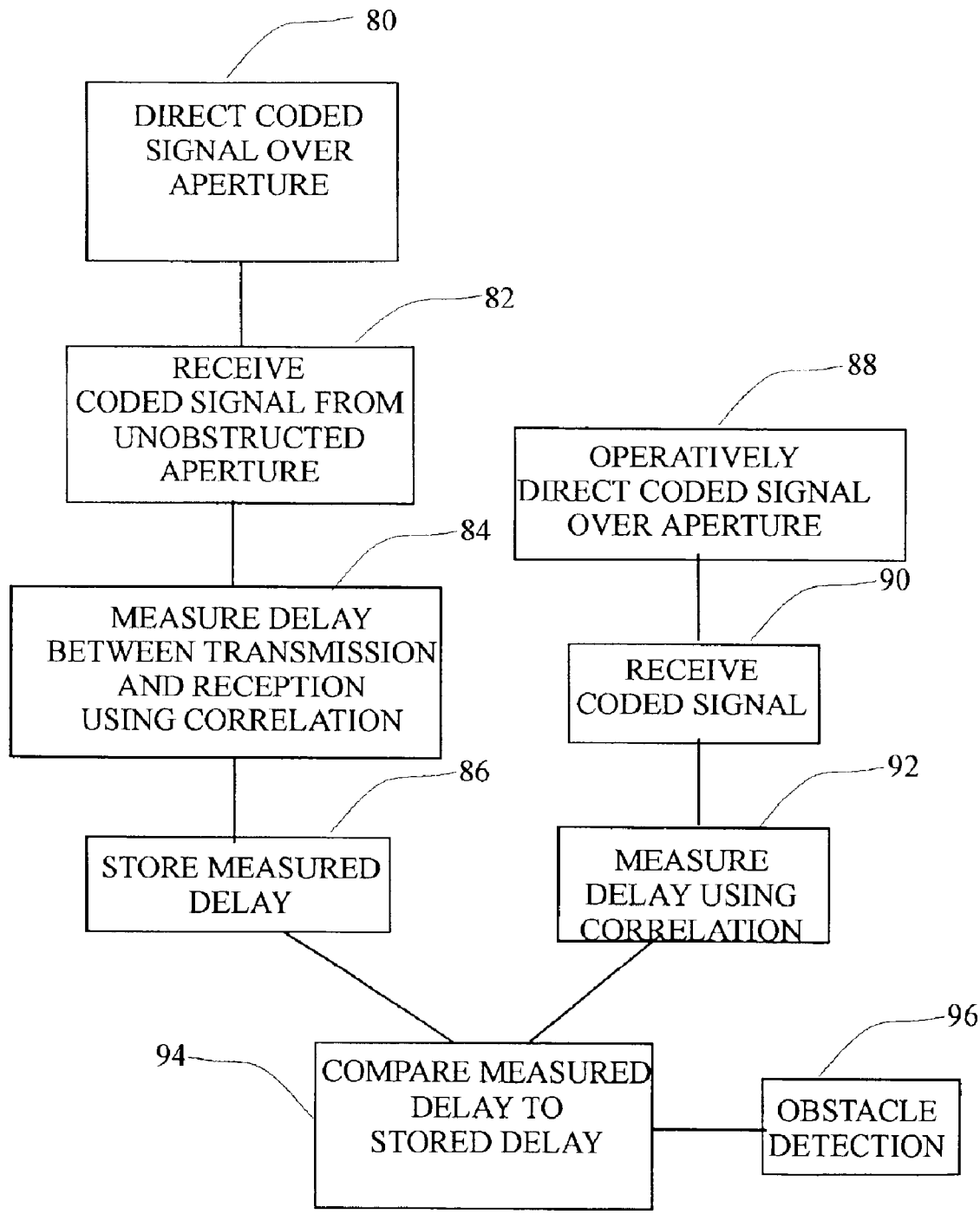
FIG. 7 is a flow chart of still another method for monitoring an aperture in accordance with the present invention.

The embodiment wherein a coded signal is used in combination with correlation is shown as a flow chart in FIG. 7. In step 80, the coded signal is directed over an unobstructed aperture. The reflected wave is received by a receiver 82, which may be collocated with the emitter from which the coded signal is emitted. The delay is measured at 84 using correlation, i.e., the time span between the emission of the coded signal and the reception of the coded signal, and stored at 86 as a reference delay for future use, i.e., during operation of the method, e.g., when installed in a vehicle. The measured delay can vary along the aperture, in which case, the reference delay may be a reference delay expressed as a function of the distance along the side of the frame defining the aperture.

Thereafter, in operation, coded signals are continuously or periodically directed over the aperture at 88 and received by a receiver 90. The delay between the emitted coded signal and the received coded signal is measured or determined at 92 and then compared with the reference delay (or reference delay function) at 94. If there is a difference between the reference delay and the operationally-measured delay, an indication of the detection of an obstacle or obstruction is provided at 96. This may take the form of a warning light, a warning alarm, cessation of an activity such as closure of the aperture, etc.

Although several preferred embodiments are illustrated and described above, there are possible combinations using other geometries, sensors, materials and different dimensions for the components that perform the same functions. This invention is not limited to the above embodiments and should be determined by the following claims.

What is claimed is:

1. A system for detecting the presence of an object in an aperture, comprising:

electromagnetic wave emitting means for emitting modulated electromagnetic waves and directing the modulated electromagnetic waves from at least one edge of a frame defining the aperture;

receiving means for receiving reflected electromagnetic waves; and measuring means for measuring a reference phase change between the modulated electromagnetic waves and the reflected electromagnetic waves, when it is known no object is present in the aperture and for measuring an operative phase change when an object is potentially present in the aperture at a different time than when the reference phase change is measured;

the operative phase change being compared to the reference phase change to determine whether there is a difference between the operative phase change and the reference phase change, whereby a difference between the reference phase change and the operative phase change is indicative of the presence of an object in the aperture.

2. The system of claim 1, wherein said receiving means comprise a linear CMOS array.

3. The system of claim 1, wherein said receiving means comprise a one-dimensional camera.

4. The system of claim 1, wherein said electromagnetic wave emitting means comprise at least one light emitting diode.

5. The system of claim 1, wherein said electromagnetic wave emitting means comprise a plurality of electromagnetic wave emitting diodes.

6. The system of claim 1, wherein said electromagnetic wave emitting means comprise a scanning laser system.

7. The system of claim 6, wherein said receiving means comprise a single photo diode.

8. The system of claim 1, wherein said electromagnetic wave emitting means are structured and arranged as modulated electromagnetic waves with a modulation wavelength between about 1 foot and 20 feet.

9. The system of claim 1, wherein said electromagnetic wave emitting means are arranged to illuminate at least a portion of said frame defining the aperture.

10. The system of claim 1, wherein said electromagnetic wave emitting means are structured and arranged to direct the electromagnetic waves into a plane substantially parallel to a plane in which the aperture is situated.

11. The system of claim 1, wherein said electromagnetic wave emitting means comprise a plurality of segments of electromagnetic wave emitting elements arranged in said frame defining the aperture.

12. The system of claim 1, wherein said receiving means comprise a lens.

13. The system of claim 1, wherein at least one of said electromagnetic wave emitting means and said receiving means comprises a mirror.

14. The system of claim 1, wherein said electromagnetic wave emitting means and said receiving means are collocated in said frame defining the aperture.

15. The system of claim 1, wherein said measuring means include a memory unit for storing the reference phase change.

16. The system of claim 1, wherein the reference phase change is expressed as a function of distance along a side of the frame defining the aperture.

17. A method for detecting the presence of an object in an aperture, comprising the steps of:

determining a reference phase change by:
      directing illuminating electromagnetic waves toward at least a portion of a frame defining the aperture when an obstacle is known not to be present in the aperture,
      modulating the illuminating electromagnetic waves,
      receiving electromagnetic waves reflected from the illuminated portion of the frame,
      measuring a phase change between the modulated electromagnetic waves and the received electromagnetic waves, and
      storing the measured phase change as the reference phase change; determining an operative phase change when an object is potentially present in the aperture by:
      directing illuminating electromagnetic waves toward the same portion of the frame defining the aperture,
      modulating the illuminating electromagnetic waves,
      receiving electromagnetic waves reflected from the illuminated portion of the frame, and
      measuring a phase change between the modulated electromagnetic waves and the received electromagnetic waves for use as the operative phase change; and detecting the presence of an obstacle in the aperture by comparing the operative phase change with the reference phase change to determine whether there is a difference between the operative phase change and the reference phase change, whereby a difference between the reference phase change and the operative phase change is indicative of the presence of an object in the aperture.

18. The method of claim 17, wherein the steps of receiving reflected electromagnetic waves comprise arranging a linear CMOS array in the frame defining the aperture.

19. The method of claim 17, wherein the steps of receiving reflected electromagnetic waves comprise arranging a one-dimensional camera in the frame defining the aperture.

20. The method of claim 17, wherein the steps of directing illuminating electromagnetic waves comprise the step of arranging at least one electromagnetic wave emitting diode in the frame defining the aperture.

21. The method of claim 17, wherein the steps of directing illuminating electromagnetic waves comprise the step of arranging a plurality of electromagnetic wave emitting diodes in the frame defining the aperture.

22. The method of claim 17, wherein the steps of directing illuminating electromagnetic waves comprise the steps of directing a laser beam and moving the laser beam to scan across at least a portion of the aperture.

23. The method of claim 22, wherein the steps of receiving the reflected electromagnetic waves comprise arranging a single photo diode in the frame defining the aperture.

24. The method of claim 17, wherein the steps of modulating the illuminating electromagnetic waves comprise modulating the electromagnetic waves with a modulation wavelength between about 1 foot and 20 feet.

25. The method of claim 17, further comprising the step of storing the reference phase change such that the operative phase change is measured at a subsequent time and compared to the stored reference phase change.

26. The method of claim 17, wherein the step of determining a reference phase change further comprises deriving a reference phase change function which expresses the reference phase change as a function of distance along a side of the frame defining the aperture, the step of detecting the presence of an object in the aperture comprises comparing the operative phase change measured along the side of the frame defining the aperture with the reference phase change function.

27. A system for detecting the presence of an object in an aperture, comprising:
   electromagnetic wave emitting means for emitting modulated electromagnetic waves and directing the modulated electromagnetic waves from at least one edge of a frame defining the aperture;
   receiving means for receiving reflected electromagnetic waves; and
   measuring means for measuring a reference phase change between the modulated electromagnetic waves and the reflected electromagnetic waves when it is known no object is present in the aperture and for measuring an operative phase change when an object is potentially present in the aperture at a different time than when the reference phase change is measured, the reference phase change being expressed as a function of distance along a side of the frame defining the aperture,
   the operative phase change being compared to the reference phase change to determine whether there is a difference between the operative phase change and the reference phase change, whereby a difference between the reference phase change and the operative phase change is indicative of the presence of an object in the aperture.

28. The system of claim 27, wherein said receiving means comprise a linear CMOS array.

29. The system of claim 27, wherein said receiving means comprise a one-dimensional camera.

30. The system of claim 27, wherein said electromagnetic wave emitting means comprise at least one light emitting diode.

31. The system of claim 27, wherein said electromagnetic wave emitting means comprise a plurality of electromagnetic wave emitting diodes.

32. The system of claim 27, wherein said electromagnetic wave emitting means comprise a scanning laser system.

33. The system of claim 32, wherein said receiving means comprise a single photo diode.

34. The system of claim 27, wherein said electromagnetic wave emitting means are structured and arranged as modulated electromagnetic waves with a modulation wavelength between about 1 foot and 20 feet.

35. The system of claim 27, wherein said electromagnetic wave emitting means are arranged to illuminate at least a portion of said frame defining the aperture.

36. The system of claim 27, wherein said electromagnetic wave emitting means are structured and arranged to direct the electromagnetic waves into a plane substantially parallel to a plane in which the aperture is situated.

37. The system of claim 27, wherein said electromagnetic wave emitting means comprise a plurality of segments of electromagnetic wave emitting elements arranged in said frame defining the aperture.

38. The system of claim 27, wherein at least one of said electromagnetic wave emitting means and said receiving means comprise a mirror.

39. The system of claim 27, wherein said electromagnetic wave emitting means and said receiving means are collocated in said frame defining the aperture.

40. A method for detecting the presence of an object in an aperture, comprising the steps of:
   determining a reference phase change function by:
      directing illuminating electromagnetic waves toward at least a portion of a frame defining the aperture when an obstacle is known not to be present in the aperture,
      modulating the illuminating electromagnetic waves,
      receiving electromagnetic waves reflected from the illuminated portion of the frame;
      measuring a phase change between the modulated electromagnetic waves and the received electromagnetic waves, and
      storing the measured phase change as a function of distance along a side of the frame defining the aperture for use as the reference phase change function;
   determining an operative phase change along the side of the frame defining the aperture when an object is potentially present in the aperture by:
      directing illuminating electromagnetic waves toward the same portion of the frame defining the aperture,
      modulating the illuminating electromagnetic waves,
      receiving electromagnetic waves reflected from the illuminated portion of the frame, and
      measuring a phase change between the modulated electromagnetic waves and the received electromagnetic waves for use as the operative phase change; and
   detecting the presence of an obstacle in the aperture by comparing the operative phase change with the reference phase change function to determine whether there is a difference between the operative phase change and the reference phase change function, whereby a difference between the reference phase change function and the operative phase change is indicative of the presence of an object in the aperture.

41. A system for detecting the presence of an object in an aperture, comprising:
   electromagnetic wave emitting means for emitting modulated electromagnetic waves and directing the modulated electromagnetic waves from at least one edge of a frame defining the aperture;
   receiving means for receiving reflected electromagnetic waves; and
   a common measuring device arranged to measure a phase change between the modulated electromagnetic waves and the reflected electromagnetic waves when it is known no object is present in the aperture for use as a reference phase change and to measure an operative phase change when an object is potentially present in the aperture at a different time than when the reference phase change is measured, the operative phase change being compared to the reference phase change to determine whether there is a difference between the operative phase change and the reference phase change, whereby a difference between the reference phase change and the operative phase change is indicative of the presence of an object in the aperture.

42. A method for detecting the presence of an object in an aperture, comprising the steps of:

determining a reference phase change between emitted, modulated electromagnetic waves and received electromagnetic waves reflected by a frame defining the aperture when an obstacle is known not to be present in the aperture;

determining an operative phase change between emitted, modulated electromagnetic waves and received electromagnetic waves when an object is potentially present in the aperture; and detecting the presence of the object in the aperture by comparing the operative phase change with the reference phase change to determine whether there is a difference between the operative phase change and the reference phase change, whereby a difference between the reference phase change and the operative phase change is indicative of the presence of the object in the aperture.

* * * * *